(No Model.)
A. POPE.
PRESSURE REGULATOR.
No. 249,088. Patented Nov. 1, 1881.
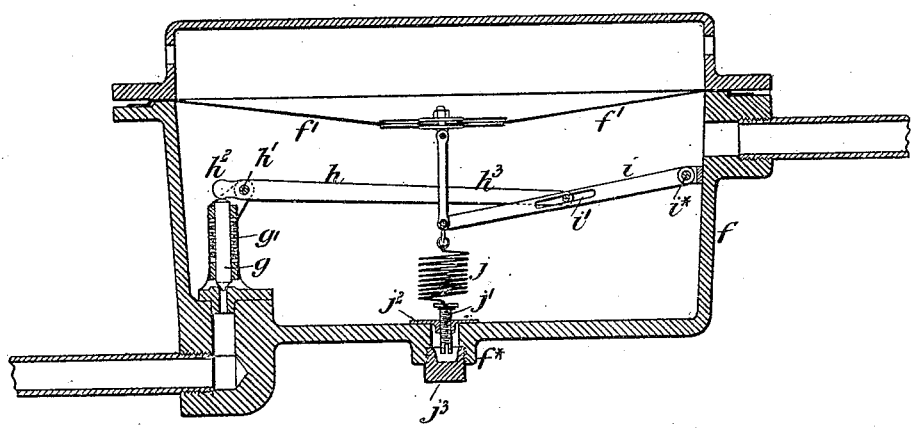
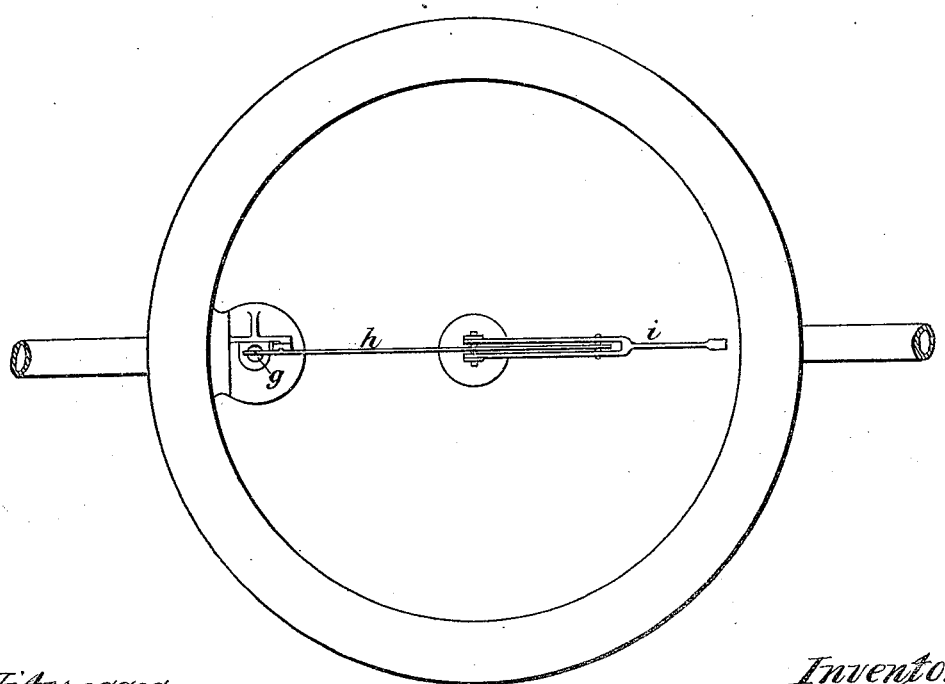
Witnesses.
J A Rutherford
Albert H Norris
Inventor.
Abraham Pope.
By James L. Norris.
Attorney.

UNITED STATES PATENT OFFICE.

ABRAHAM POPE, OF SLOUGH, ASSIGNOR TO GORDON DONALDSON PETERS, OF LONDON, ENGLAND.

PRESSURE-REGULATOR.

SPECIFICATION forming part of Letters Patent No. 249,088, dated November 1, 1881.

Application filed December 20, 1880. (No model.) Patented in England September 13, 1880.

*To all whom it may concern:*

Be it known that I, ABRAHAM POPE, of Slough, England, engineer, have invented a new and useful Improvement in Pressure-Regulators for Gas, (for which I have obtained a patent in Great Britain, No. 3,730, bearing date September 13, 1880,) of which the following is a specification, reference being had to the accompanying drawings.

My invention relates to apparatus for regulating the supply and pressure of gas to the burners.

Figure 1 is a plan of the regulator with the cover removed, and Fig. 2 is a vertical central section of the same.

My improved regulator is constructed in the form of a case or box, $f$, provided with an elastic diaphragm, $f'$, and with a valve, $g$, for admitting the gas into the space below the said diaphragm. The said valve is forced toward its seat by levers $h\ i$ against the action of a spring, $g'$, which tends to retract the said valve. These levers are compound, as shown—that is to say, the lever $h$ has its fulcrum $h'$ near the valve, and its short arm $h^2$ bears on the said valve, while its long arm $h^3$ extends to and works in a slot, $i'$, in the lever $i$, which is fulcrumed at $i^*$ to the opposite side of the apparatus.

By means of these compound levers the valve may be worked with a much lighter pressure on the diaphragm $f'$ than has been heretofore practicable. I thereby prevent danger of the rupture of the said diaphragm. The slotted lever $i$ is connected with a spiral spring, $j$, placed in a direct line with the center of the diaphragm $f'$. The tension of this spiral spring may be adjusted according to the pressure required in the regulator from the outside of the latter. For this purpose I connect the lower end of the said spring with a screw, $j'$, which extends through a plate, $j^2$, into a neck or socket, $f^*$, which is closed externally by a screw-plug, $j^3$. The latter may be readily removed to permit the insertion of a screw-driver to turn the said screw and thereby adjust the spring without permitting any gas to escape.

I do not broadly claim a pressure-regulator in which a horizontal diaphragm is connected with a system of vertically-swinging levers, the end of one of which acts upon a valve and is connected with a spring and a weight; nor do I broadly claim a spring connected with an adjusting-screw, as such features of themselves do not constitute my invention. It should be observed that in my invention the spring attached to the adjusting-screw is centrally connected with the diaphragm by a direct connection, and, further, is arranged centrally with relation to the vertically-swinging levers, by which arrangement of parts a very rapid and prompt retraction of the diaphragm to its normal position is positively insured. It should also be observed that in my structure the two levers are directly connected by a slot-and-pin connection, whereby the apparatus is simplified, the parts act quickly and promptly, and are rendered less complicated in construction.

What I claim is—

In a gas-pressure regulator, the combination, with the case $f$, provided with an interior horizontal diaphragm, $f'$, of the compound levers $h$ and $i$, pivoted at their outer ends, and one provided with a pin entering a slot in the other, said levers being connected with the diaphragm and arranged to swing in a vertical plane, a valve, $g$, arranged beneath a part of the lever $h$, which projects beyond its pivot, and a spring connected at one end with the lever $i$ and centrally with the diaphragm, and at its other end with an adjusting device, the said members being organized in the described relation for operation as set forth.

ABRAHAM POPE.

Witnesses:
WILLIAM CROSS,
LEWIS SANDERSON.